(12) United States Patent
Yumiki et al.

(10) Patent No.: US 9,310,906 B2
(45) Date of Patent: Apr. 12, 2016

(54) ELECTRONIC DEVICE

(71) Applicant: Panasonic Corporation, Osaka (JP)

(72) Inventors: Naoto Yumiki, Osaka (JP); Yusuke Adachi, Osaka (JP); Ryo Okumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 142 days.

(21) Appl. No.: 13/667,253

(22) Filed: Nov. 2, 2012

(65) Prior Publication Data
US 2013/0120290 A1 May 16, 2013

(30) Foreign Application Priority Data

Nov. 11, 2011 (JP) ................................. 2011-247184
Sep. 27, 2012 (JP) ................................. 2012-214767

(51) Int. Cl.
*G06F 3/041* (2006.01)
*G06F 3/0488* (2013.01)
*G06F 3/01* (2006.01)

(52) U.S. Cl.
CPC ................ *G06F 3/041* (2013.01); *G06F 3/016* (2013.01); *G06F 3/0488* (2013.01)

(58) Field of Classification Search
CPC ......... G06F 3/041; G06F 3/044; G06F 3/016; G06F 3/0488; F21V 29/00
USPC ................................... 345/173, 174; 362/373
See application file for complete search history.

(56) References Cited

U.S. PATENT DOCUMENTS

| 2007/0081344 | A1* | 4/2007 | Cappaert et al. | 362/373 |
| 2009/0179866 | A1 | 7/2009 | Agevik et al. | |
| 2011/0141047 | A1 | 6/2011 | Iwaizumi et al. | |
| 2013/0027320 | A1* | 1/2013 | Chang et al. | 345/173 |
| 2013/0027345 | A1* | 1/2013 | Binzel | 345/174 |
| 2013/0063368 | A1* | 3/2013 | Geiger et al. | 345/173 |

FOREIGN PATENT DOCUMENTS

| JP | 05-158607 A | 6/1993 |
| JP | 2006-268068 A | 10/2006 |
| JP | 2008-282125 A | 11/2008 |
| JP | 2011-510371 A | 3/2011 |

* cited by examiner

*Primary Examiner* — Lun-Yi Lao
*Assistant Examiner* — Johny Lau
(74) *Attorney, Agent, or Firm* — Renner, Otto, Boisselle & Sklar, LLP

(57) ABSTRACT

The user is allowed to simulatively experience a tactile sensation that would be felt when actually touching on the object being displayed on a screen. An electronic device 100 includes a display device 160 for displaying displayed information, a touch panel 130 to be touched by the user, a displayed information control section 32 for controlling display of the displayed information, thermoelectric element sections 190 for cooling or heating the touch panel 130, and a temperature control section 195 for controlling the temperature of the touch panel 130 in accordance with the displayed information displayed on the display device 160.

14 Claims, 14 Drawing Sheets

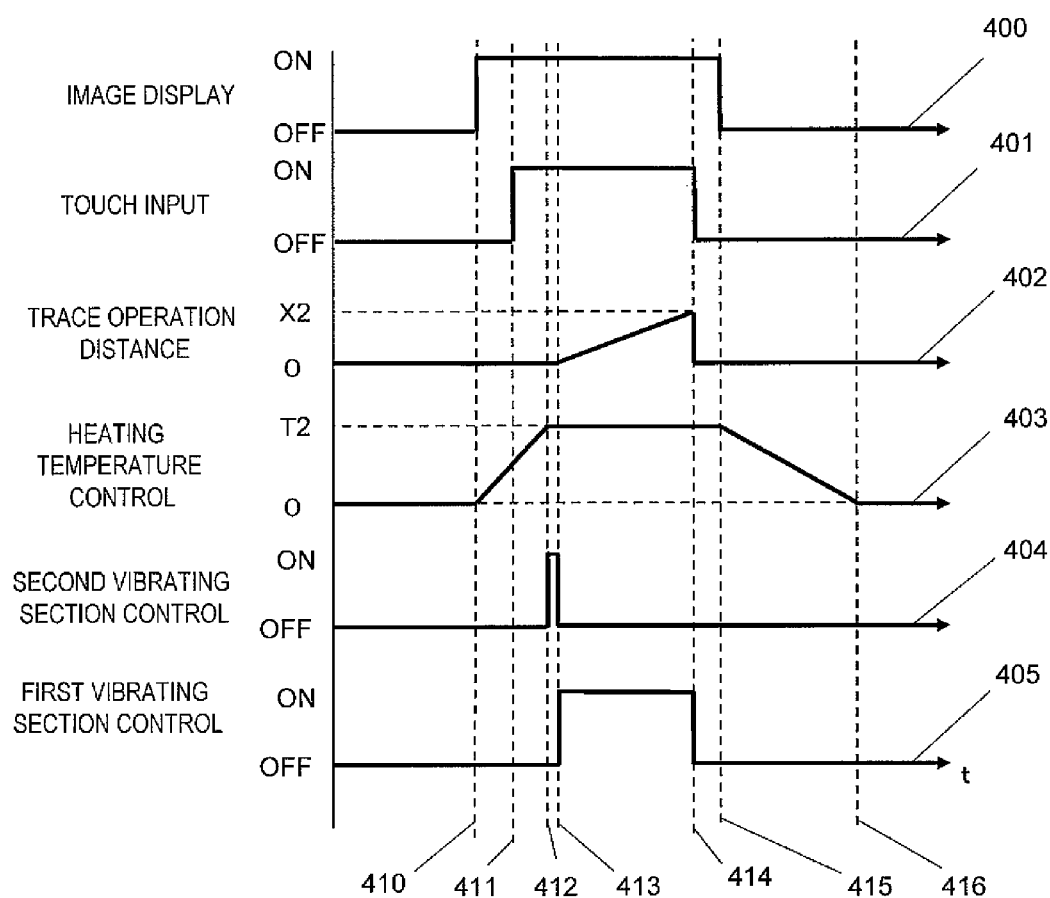

ELECTRONIC DEVICE

BACKGROUND

1. Technical Field

The present disclosure relates to an electronic device which can be operated by a user.

2. Description of the Related Art

Electronic devices with touch panels have become widespread. Such an electronic device is operated by a user sliding a finger on a touch panel.

Japanese Laid-Open Patent Publication No. 5-158607 discloses a braille display which allows for operations using braille characters on an automated teller machine, etc. In the braille display of Japanese Laid-Open Patent Publication No. 5-158607, a large number of heating elements are provided in a matrix pattern on the screen, and some of the heating elements are heated to form braille characters, whereby a user can read the braille characters by touching the portions heated in the pattern of the braille characters.

SUMMARY

The present disclosure provides an electronic device capable of presenting, to a user, tactile sensations associated with information displayed on the screen.

An electronic device of the present disclosure includes a display section for displaying displayed information, a panel member to be touched by a user, a display control section for controlling the display of the displayed information, a thermoelectric element for cooling or heating the panel member, and a temperature control section for controlling a temperature of the panel member in accordance with the displayed information displayed on the display section.

With the electronic device of the present disclosure, it is possible to present a tactile sensation associated with the displayed information to the user.

BRIEF DESCRIPTION OF THE DRAWINGS

FIG. 15 is a timing diagram during a second trace operation performed on an electronic device according to an embodiment.

DETAILED DESCRIPTION

Figure 1:
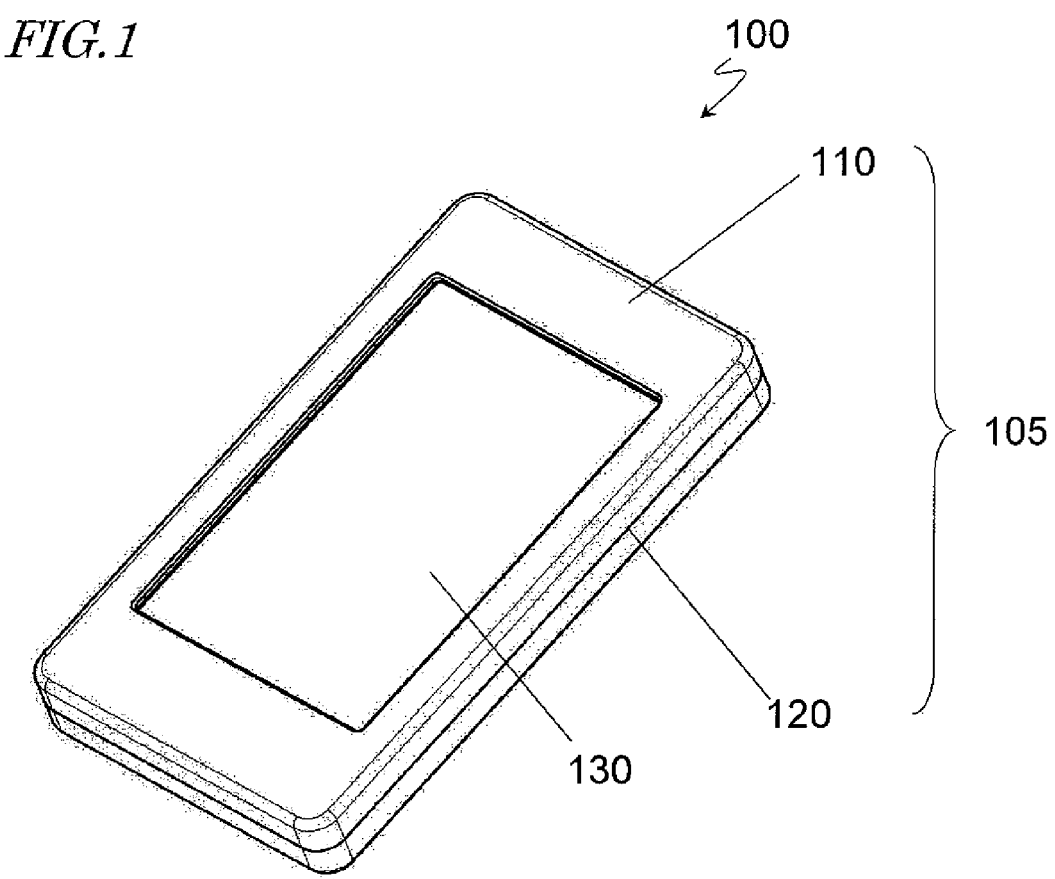
FIG. 1 is a perspective view showing a general configuration of an electronic device according to an embodiment.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

(Embodiments)

<General Configuration of Electronic Device>

Referring to FIGS. 1 to 4, a general configuration of an electronic device will be described. FIG. 1 is a perspective view showing a general configuration of an electronic device 100 according to the present embodiment.

Figure 2:
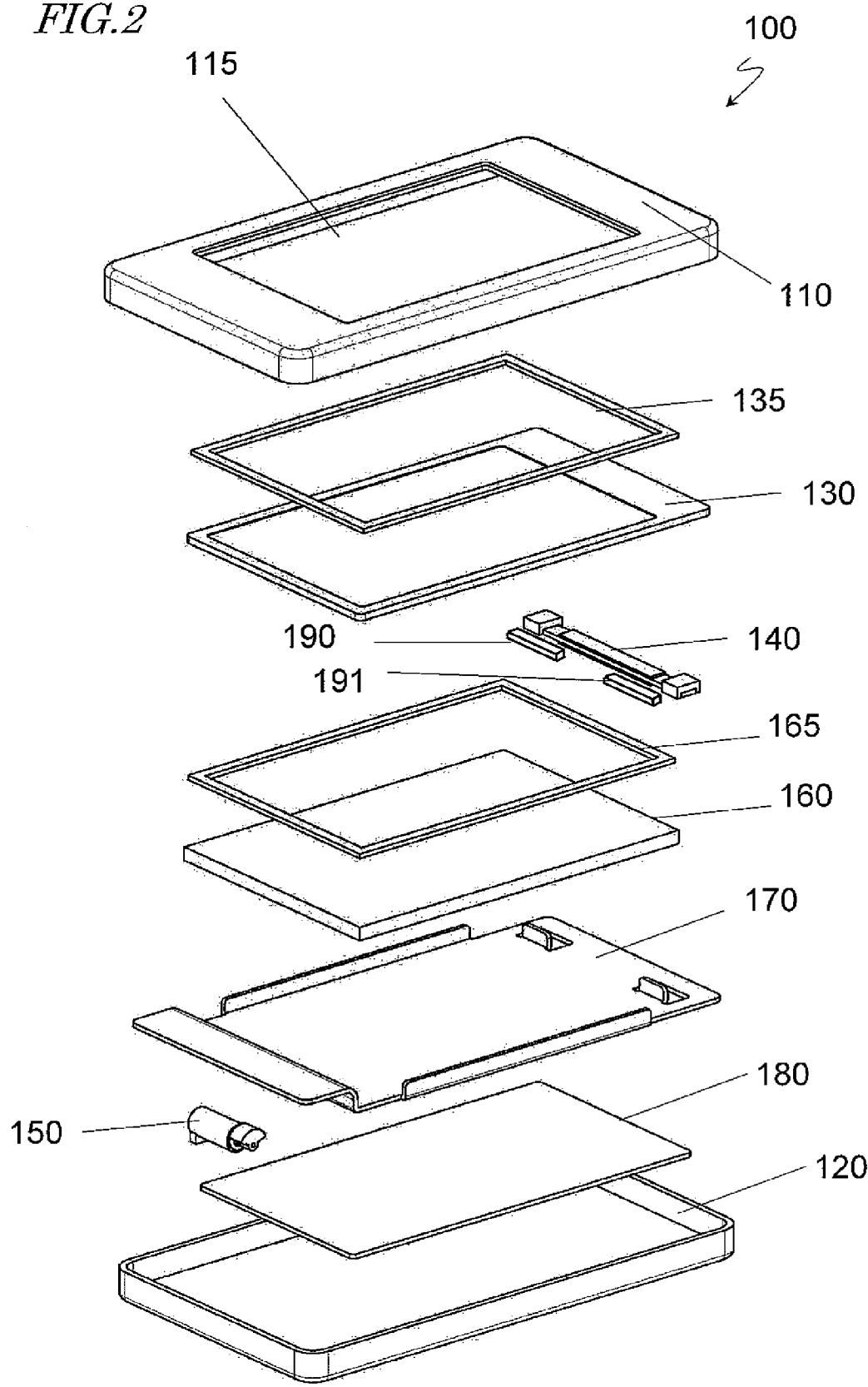
FIG. 2 is an exploded perspective view of an electronic device according to an embodiment.
Figure 3:
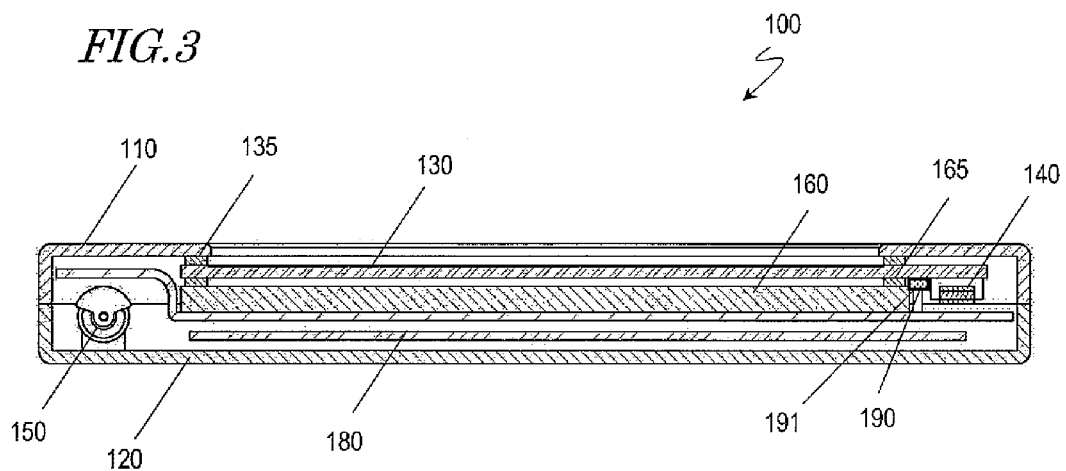
FIG. 3 is a cross-sectional view of an electronic device according to an embodiment.
Figure 4:
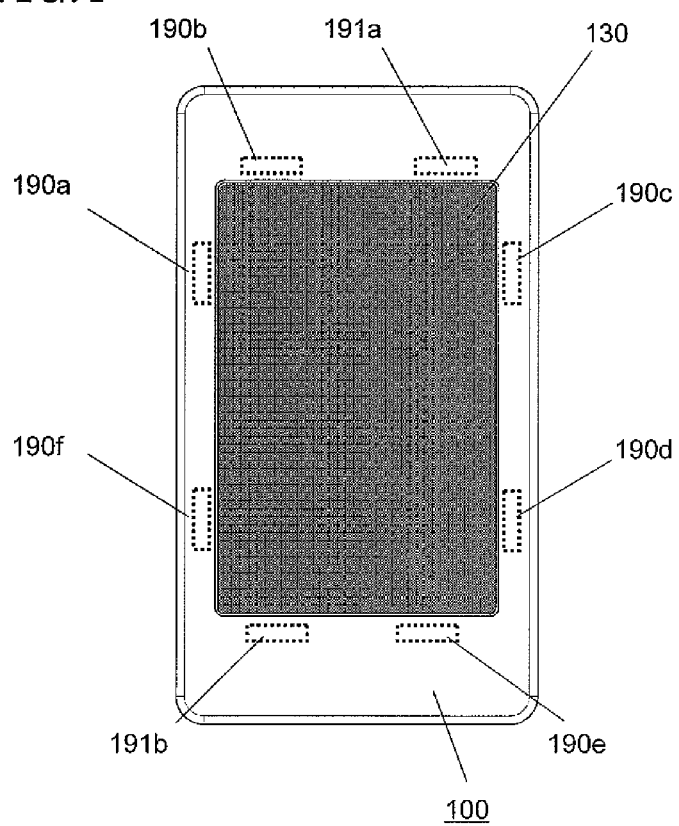
FIG. 4 is a layout diagram of thermoelectric element sections and temperature detecting element sections according to an embodiment.
Figure 5:
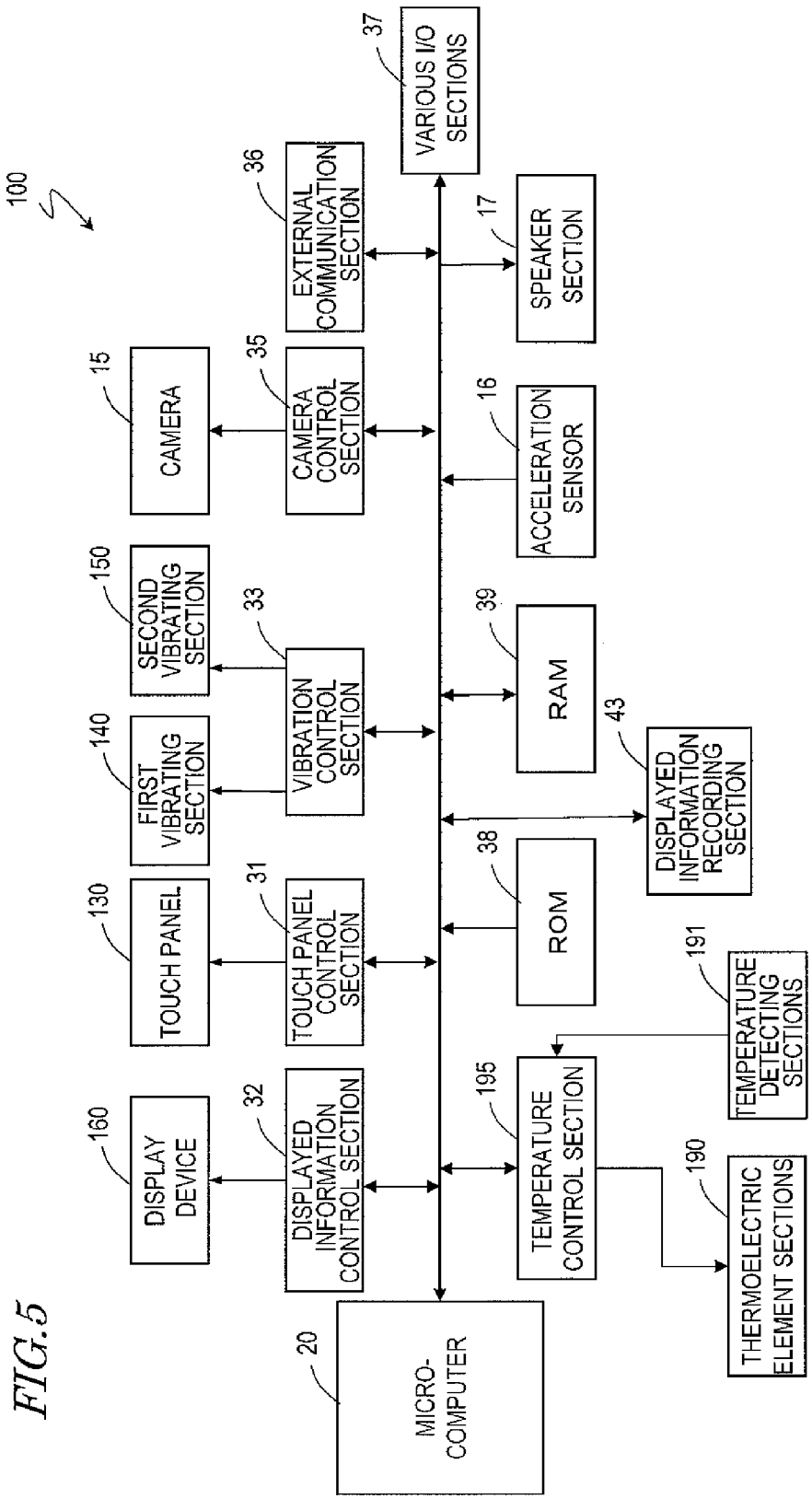
FIG. 5 is a block diagram showing an electronic device according to an embodiment.

FIG. 2 is an exploded perspective view of the electronic device 100 according to the present embodiment. FIG. 3 is a cross-sectional view of the electronic device 100 according to the present embodiment. FIG. 4 is a layout diagram of thermoelectric element sections 190 arranged across the electronic device 100 according to the present embodiment. FIG. 5 is a block diagram of the electronic device 100 according to the present embodiment.

As shown in FIGS. 1 to 4, the electronic device 100 includes a display device 160, a touch panel 130 arranged on the display surface side of the display device 160 so as to cover the display device 160, the thermoelectric element sections 190 for controlling the surface temperature of the touch panel 130, a first vibrating section 140 for vibrating the touch panel 130, and a second vibrating section 150 for vibrating a lower casing 120.

A user operates the electronic device 100 by touching the touch panel 130 with a finger, a pen, or the like, on the contents displayed on the display device 160.

An upper casing 110 and the lower casing 120 are coupled together with screws, or the like, thereby forming a casing 105 of the electronic device 100. A display window 115 is formed in the upper casing 110, and the touch panel 130 can be operated through the display window 115.

A plurality of thermoelectric element sections 190 (190a to 190e) are attached to the reverse surface (the surface on the side of the display device 160) of the touch panel 130. The thermoelectric element sections 190 include Peltier elements, for example. A Peltier element is a plate-shaped semiconductor element utilizing the Peltier effect, whereby when a current flow is generated through a junction between two different metals, heat transfers from one metal to the other. When a DC current flow is generated in a predetermined direction through the thermoelectric element sections 190, the surface on the side of the touch panel 130 absorbs heat, thus providing a heat-absorbing thermoelectric module having a cooling effect for the user. On the other hand, when a current flow of the opposite direction is generated, the surface on the side of the touch panel 130 generates heat, thus providing a heat-generating thermoelectric module. Note that the thermoelectric element sections 190 are not limited to Peltier elements, but may be any other suitable elements.

A plurality of temperature detecting sections 191 (191a to 191b) are attached to the reverse surface of the touch panel 130. The temperature detecting sections 191 include thermocouples, thermistors, or the like, for example. The touch panel 130 is cooled or heated by the thermoelectric element sections 190, and the temperature on the surface of the touch panel 130 is measured by the temperature detecting sections 191, with the results fed back to a temperature control section 195 to be described below, thereby precisely controlling the surface of the touch panel 130 at a predetermined temperature.

The first vibrating section 140 is attached to the reverse of the touch panel 130, and by driving the first vibrating section 140, it is possible to vibrate the touch panel 130 and give the user a tactile sensation.

A cushion material 135 is provided between the upper casing 110 and the surface of the touch panel 130 so that the vibration of the touch panel 130 is not directly transferred to the upper casing 110. The display device 160 is arranged on the surface of the touch panel 130 opposite to the surface thereof on the side of the upper casing 110, and a cushion material 165 is provided as described above so that the vibration of the touch panel 130 is not directly transferred to the display device 160. The cushion materials 135 and 165 are shock-absorbing members of a silicon rubber, a urethane rubber, or the like, for example.

An image displayed on the display device 160 can be visually seen through the touch panel 130 from the side of the display window 115.

The display device 160 is attached to a frame 170, which is fixed to the lower casing 120, and is fixed inside the electronic device 100.

The second vibrating section 150 is attached to the lower casing 120. By driving the second vibrating section 150, the lower casing 120 is vibrated. As the lower casing 120 vibrates, it is possible to give tactile sensations to a user.

A circuit substrate 180 is attached to the lower casing 120, and the touch panel 130, the display device 160 and the first and second vibrating sections 140 and 150 are electrically connected thereto. The touch panel 130, the display device 160 and the first and second vibrating sections 140 and 150 are controlled by a microcomputer 20 provided on the circuit substrate 180.

Note that the touch panel 130 is of an electrostatic type, a resistive type, an optical type, an ultrasonic type, an electromagnetic type, etc. The touch panel 130 is capable of detecting the touch position of a user. For its structure, the touch panel 130 is often attached to a glass plate, in which case the touch panel is defined to include the glass plate. The touch panel 130 is controlled by a touch panel control section 31. The microcomputer 20 can obtain information of the touch position of the user via the touch panel control section 31.

The display device 160 may be of a liquid crystal type, an organic EL type, an electronic paper type, a plasma type, etc. The display device 160 is controlled by a displayed information control section 32. The microcomputer 20 can present, to a user, an intended display on the display device 160 via the displayed information control section 32.

Note that while the touch panel 130 and the display device 160 are separated from each other in the present embodiment, the touch panel 130 and the display device 160 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel. Employing such a configuration, it is possible to further reduce the thickness and the weight.

As shown in FIG. 5, the electronic device 100 of the present embodiment includes the microcomputer 20, a ROM 38 for storing various programs, a RAM 39 for storing various data, the display device 160, the displayed information control section 32 for controlling the display device 160, the touch panel 130, the touch panel control section 31 for controlling the touch panel 130, the thermoelectric element sections 190, the temperature detecting sections 191, the temperature control section 195 for controlling the thermoelectric element sections 190 and the temperature detecting sections 191 in accordance with the displayed information, the first vibrating section 140, the second vibrating section 150, a vibration control section 33 for controlling the first vibrating section 140 and the second vibrating section 150 in accordance with the displayed information, a camera 15 for capturing an image, a camera control section 35 for controlling the camera 15, an acceleration sensor 16 for measuring the acceleration or the shock of the electronic device 100, a speaker section 17 for generating sound, an external communication section 36 responsible for communication with external units, a displayed information recording section 43 for recording displayed information, and various I/O sections 37 responsible for various inputs and outputs.

The external communication section 36 is connected while being authenticated for mutual connections between electronic devices, using a wireless LAN such as Wi-Fi (registered trademark), for example. The connection between electronic devices may be a connection via an external communication device such as an access point, or a P2P (wireless ad hoc network) connection, which is a direct connection with no external communication device therebetween.

Recorded in a displayed image recording section 43 for recording displayed information are the displayed information and at least one of temperature information and vibration pattern information associated with a tactile sensation (a skin sensation such as a temperature sensation or a feel) of an object represented by the displayed information. The microcomputer 20 functions as a determination section for determining whether the temperature information and the vibration pattern information are stored. Where the temperature information is stored, the temperature control section 195 controls the temperature of the touch panel 130 in accordance with the temperature information. Where the vibration pattern information is stored, the vibration control section 33 controls the vibration of the first vibrating section 140 and/or the second vibrating section 150 in accordance with the vibration pattern information.

The temperature information and the vibration pattern information associated with displayed information can be freely downloaded by a user, using the external communication section 36, free of charge or for a charge. The temperature information and the vibration pattern information may be information representing the temperature and the vibration pattern prescribed by the user for displayed information. For example, when a user captures an image of a subject, the user may prescribe temperatures and vibration patterns for the image information, as information representing the temperature or the feel of the subject.

<Configuration of Vibrating Section>

Figure 6:
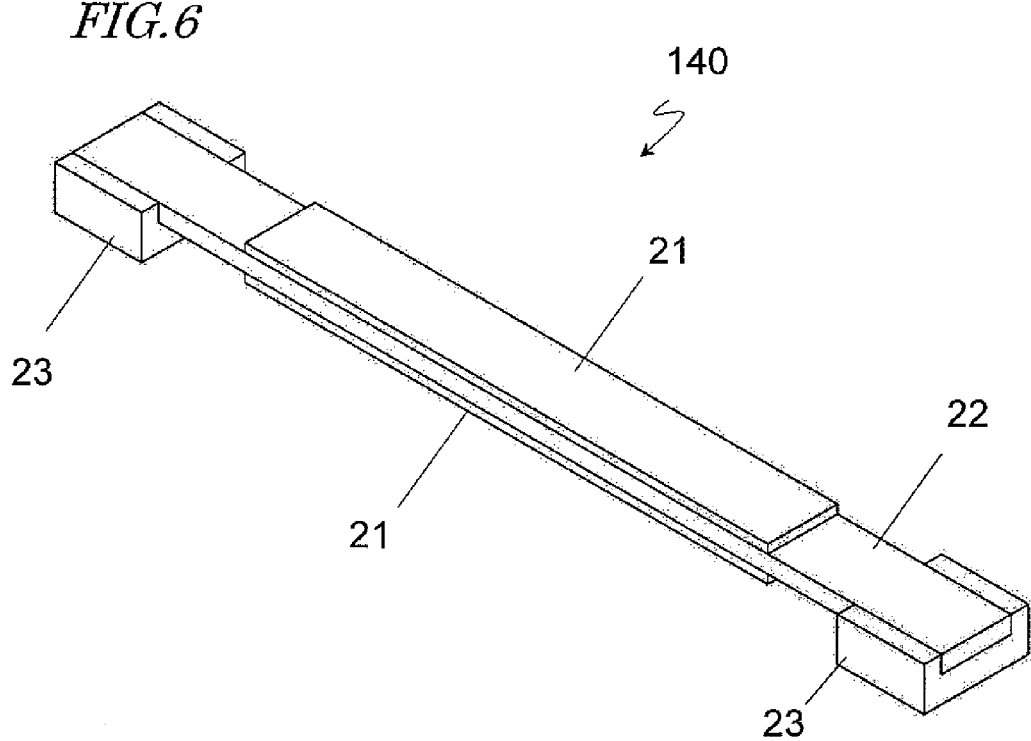
FIG. 6 is a perspective view of a first vibrating section according to an embodiment.
Figure 7:
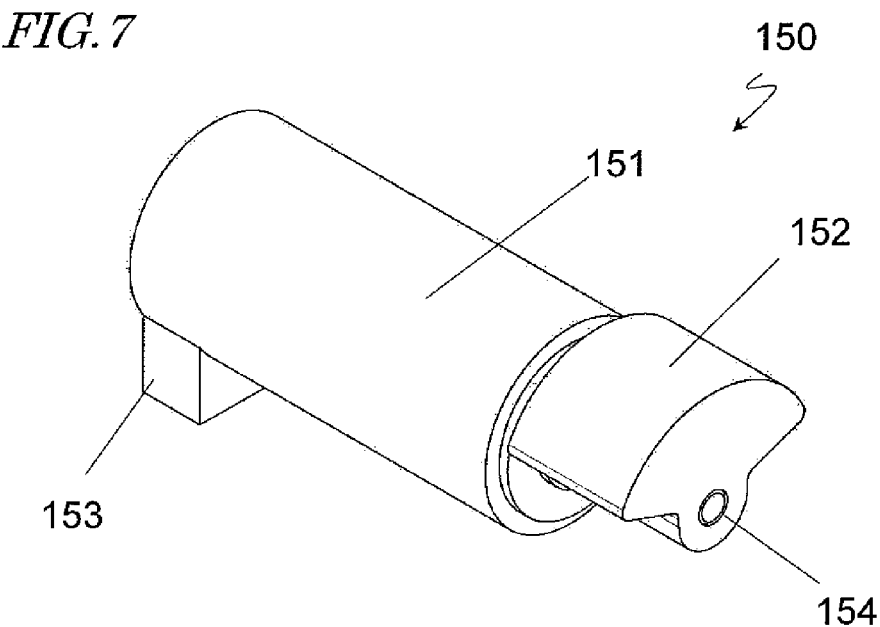
FIG. 7 is a perspective view of a second vibrating section according to an embodiment.

Next, configurations of the first and second vibrating sections 140 and 150 will be described with reference to FIGS. 6 and 7. FIG. 6 is a perspective view of the first vibrating section 140 of the present embodiment. FIG. 7 is a perspective view of the second vibrating section 150 of the present embodiment.

As shown in FIG. 6, the first vibrating section 140 includes piezoelectric elements 21, a shim plate 22, and bases 23. The piezoelectric elements 21 are bonded on opposite sides of the shim plate 22. The piezoelectric element 21 is, for example, piezoelectric ceramic of lead zirconate titanate, or the like, or piezoelectric single crystal of lithium niobate, or the like. The opposite ends of the shim plate 22 are attached to the bases 23, thereby forming a so-called fixed-fixed structure. The bases 23 are attached to the touch panel 130. The piezoelectric elements 21 are stretched and shrunk by a voltage from the vibration control section 33. For example, a control is performed such that one of the piezoelectric elements 21 attached on opposite sides of the shim plate 22 stretches while the other shrinks, thereby bending the shim plate 22. This can be alternately repeated, thereby generating a vibration.

The shim plate 22 is, for example, a spring member of phosphor bronze, etc. The vibration of the shim plate 22 vibrates the touch panel 130 via the bases 23. A user operating the touch panel 130 can feel the vibration of the touch panel 130 by touching the touch panel 130.

The bases 23 are, for example, a metal such as aluminum or brass, or a plastic such as PET or PP.

The frequency, amplitude and cycle of vibration are controlled by the vibration control section 33. The frequency of vibration is preferably about 100 to 400 Hz.

While the piezoelectric elements 21 are attached to the shim plate 22 in the present embodiment, the piezoelectric elements 21 may be attached directly to the touch panel 130. Alternatively, the piezoelectric elements 21 may be attached directly to any of the members of the electronic device 100, e.g., the display device 160 or the casing 110. Alternatively, a thin-film transparent piezoelectric member may be formed on the touch panel 130 by method such as sputtering, and used as the first vibrating section 140. Where a cover member, or the like, is present on the touch panel 130, the piezoelectric elements 21 may be attached to the cover member.

While the present embodiment employs a fixed-fixed structure where the opposite ends of the shim plate 22 are supported by the bases 23, it may employ a cantilever structure where only one end of the shim plate 22 is supported by the base 23.

As shown in FIG. 7, the second vibrating section 150 includes a DC motor 151, an eccentric weight 152, and a support section 153. The DC motor 151 is attached to the support section 153, and the support section 153 is attached to the lower casing 120.

The eccentric weight 152 is attached to the tip of a rotation shaft 154 of the DC motor 151. When a driving voltage is applied to the DC motor 151, the eccentric weight 152 attached to the rotation shaft 154 rotates. The rotary motion of the eccentric weight 152 generates a vibration.

The vibration of the DC motor 151 vibrates the lower casing 120 via the support section 153. A user operating the electronic device 100 can feel the vibration of the casing 105 of the electronic device 100 when a user is holding the electronic device 100 with one hand, for example.

The support section 153 is a shock-absorbing member of a plastic such as PET or PP, a silicon rubber, a urethane rubber, etc., for example.

<Description of Vibration Pattern>

Figure 8A:
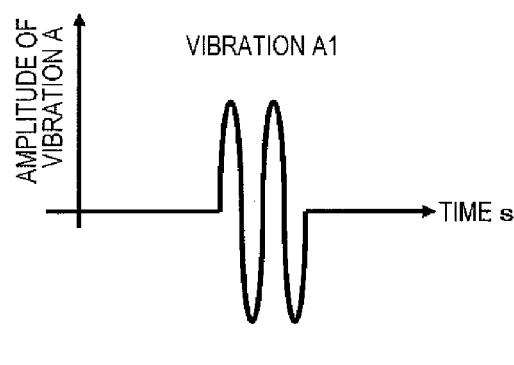
FIGS. 8A and 8B are schematic diagrams each showing an example of a vibration pattern of a first vibrating section according to an embodiment.
Figure 8B:
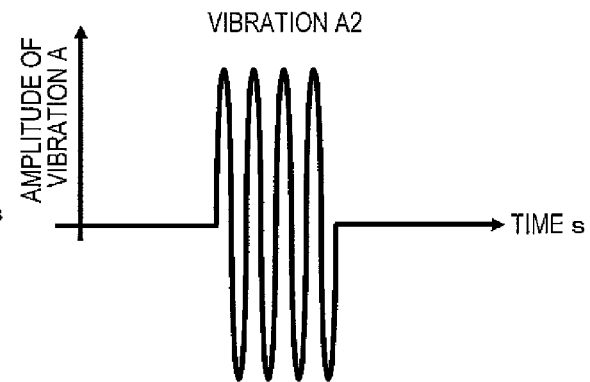

FIGS. 8A and 8B are schematic diagrams showing an example of a vibration pattern of the first vibrating section 140.

In response to an instruction from the microcomputer 20, the vibration control section 33 applies a voltage to the first vibrating section 140 to vibrate the touch panel 130 with the amplitude of FIG. 8A, thereby giving a user vibration A1. The voltage for generating vibration A1 is a sinusoidal wave of 150 Hz, 70 Vrms and 2 cycles, for example. Then, the amplitude on the touch panel 130 is about 5 μm. The vibration control section 33 applies a voltage to the first vibrating section 140 to vibrate the touch panel 130 with the amplitude of FIG. 8B, thereby giving a user vibration A2. The voltage for generating vibration A2 is a sinusoidal wave of 300 Hz, 100 Vrms and 4 cycles, for example. Then, the amplitude on the touch panel 130 is about 15 μm. The frequency, the voltage and the number of cycles are merely illustrative, and it may be a different waveform such as a square wave or sawtooth wave, an intermittent waveform, or a waveform whose frequency or amplitude changes continuously. Note that by setting the frequency and the voltage so that the amplitude on the touch panel 130 is about 5-50 μm, it is possible to present a tactile sensation (vibration) that feels comfortable on a finger of a person.

FIGS. 9A to 9D are schematic diagrams showing an example of a vibration pattern of the second vibrating section 150.

Figure 9A:
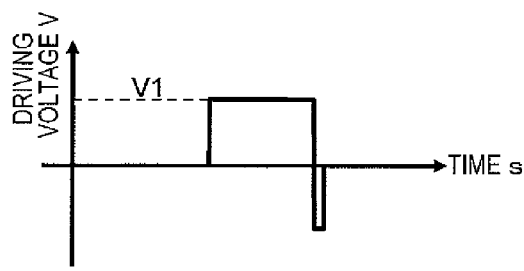
FIG. 9A is a schematic diagram showing an example of a driving voltage for a second vibrating section according to an embodiment.

In response to an instruction from the microcomputer 20, the vibration control section 33 applies voltage V1 as shown in FIG. 9A to the second vibrating section 150. Thus, the DC motor 151 rotates. In order to stop the rotation, a voltage obtained by reversing voltage V1 can be applied so as to brake the rotation. A vibration is generated as the eccentric weight 152 shown in FIG. 7 rotates about the rotation shaft 154, thereby giving vibration B1 to a user as shown in FIG. 9B.

Figure 9C:
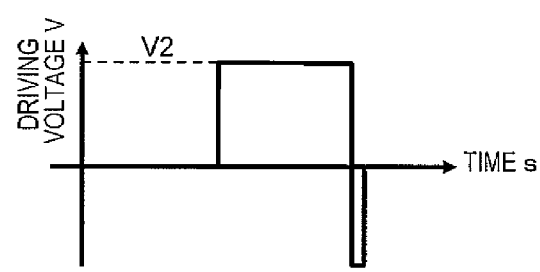
FIG. 9C is a schematic diagram showing an example of a driving voltage for the second vibrating section according to an embodiment.
Figure 9B:
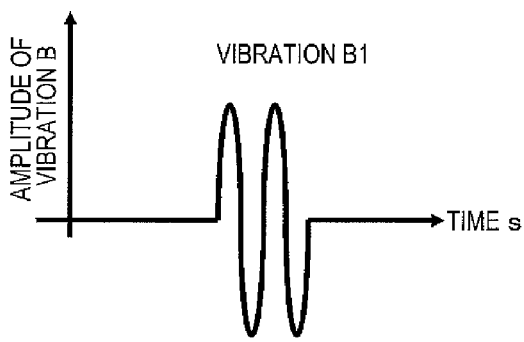
FIG. 9B is a schematic diagram showing an example of a vibration pattern of the second vibrating section according to an embodiment.
Figure 9D:
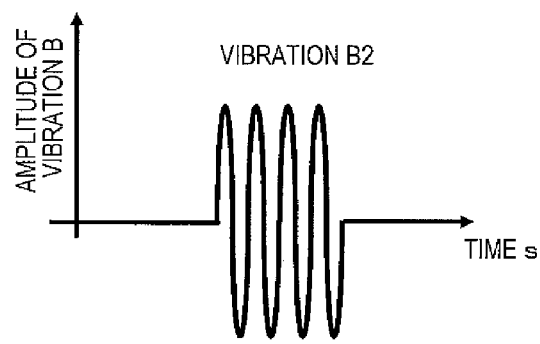
FIG. 9D is a schematic diagram showing an example of a vibration pattern of the second vibrating section according to an embodiment.

The vibration control section 33 applies voltage V2 greater than voltage V1 to the second vibrating section 150 as shown in FIG. 9C. Thus, the DC motor 151 rotates. In order to stop the rotation, a voltage obtained by reversing voltage V2 can be applied so as to brake the rotation. A vibration is generated as the eccentric weight 152 shown in FIG. 7 rotates about the rotation shaft 154, thereby giving vibration B2 to a user as shown in FIG. 9D. Since the speed of the DC motor 151 is higher with vibration B2 than that with vibration B1, vibration B2 gives a user a vibration with a higher frequency than vibration B1.

Note that the waveforms of the voltages applied to the DC motor 151 are merely illustrative, and it may be a different waveform such as a square wave or a saw-tooth wave, an intermittent waveform, or a waveform whose frequency or amplitude changes continuously.

With the first vibrating section 140 including the piezoelectric elements 21, it is easy to change the amplitude of vibration by changing the value of the voltage applied to the piezoelectric elements. It is also easy to change the frequency of vibration by changing the frequency of the voltage applied to the piezoelectric elements. Thus, the first vibrating section 140 including the piezoelectric elements 21 can generate vibrations of various patterns, and can present, to a user, various tactile sensations associated with information displayed on the touch panel.

<Description of Trace Operation>

The trace operation used by a user operating the electronic device 100 will be described with reference to FIG. 10. The display device 160 displays an object represented by displayed information. For example, displayed information is image information of a captured image of a subject or computer graphics image information.

Figure 10:
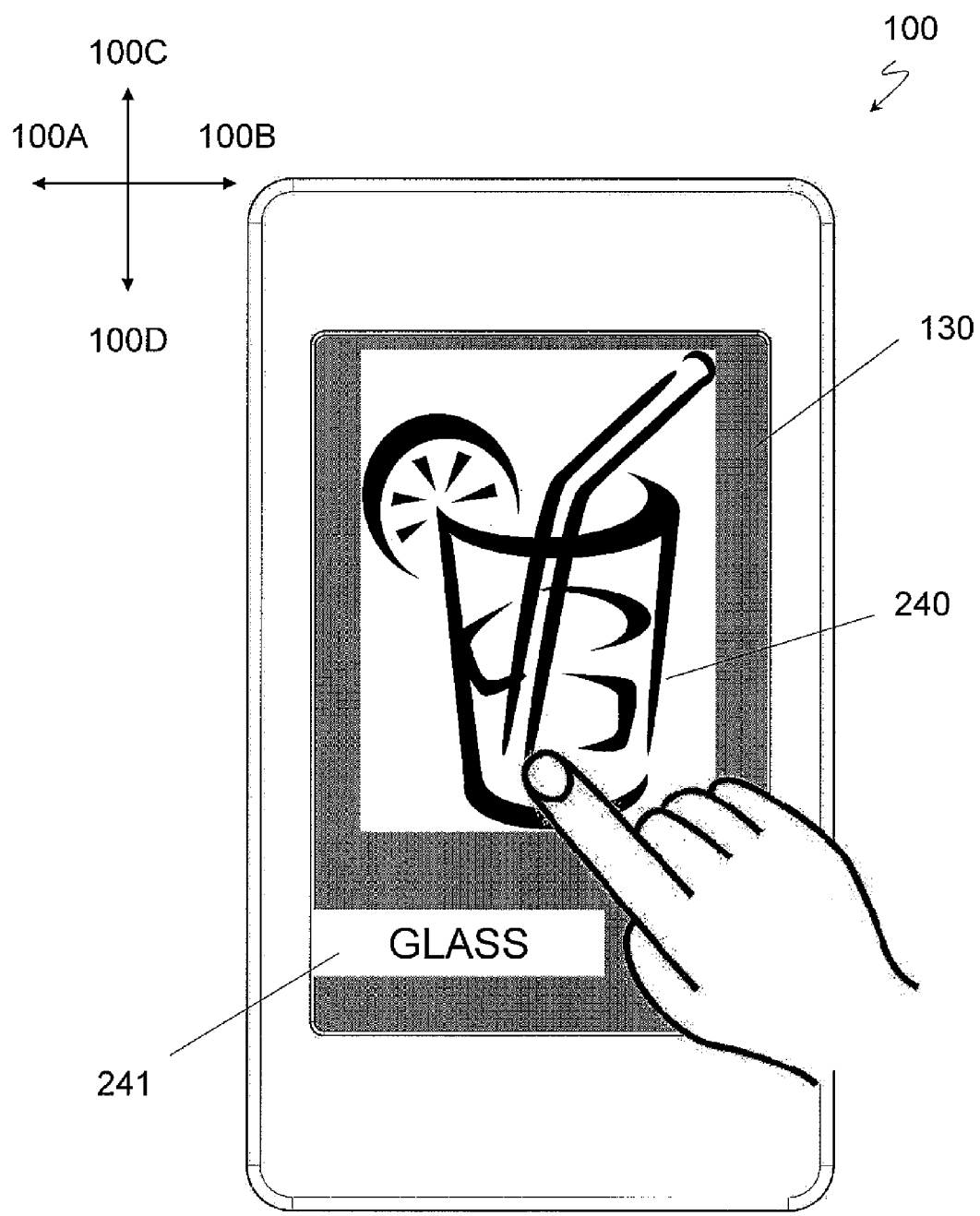
FIG. 10 is a diagram showing an example of a operation screen displayed on an electronic device according to an embodiment.

FIG. 10 is an example of an operation screen displayed on the electronic device 100, showing a displayed image of an object such as a glass whose surface temperature is intuitively associable. Note that while the operation performed by a user on the touch panel will now be described assuming that the operation is performed with a finger, the means for input is not limited to a finger but may be another member such as a pen. The methods of operating the touch panel 130 with a finger generally include the operation of tapping the finger on the screen, the operation of double-tapping the finger on the screen, the operation of flicking the finger on the screen, the operation of moving the finger without lifting the finger off the screen, the operation of pinching two fingers together, and the operation of spreading two fingers apart. In order for the user's finger to virtually feel the tactile sensation of the real version of an object displayed on the display screen, the operation of moving the finger without lifting the finger off the screen is suitable, among other methods of operation. Therefore, the present embodiment employs such a process that it is possible to take advantage of that operation. Note that the operation of moving the finger without lifting the finger off the screen will hereinafter be referred to as the "trace operation".

The trace operation by a user is an operation of making a touch input on the touch panel 130 with the finger, sliding the finger quickly in the up, down, left and right directions on the touch panel 130, and then lifting the finger off the touch panel 130 at an intended position. For example, the trace operation is used for checking the surface state of a glass image 240 displayed on the display device 160 as shown in FIG. 10. The glass image 240 and text information 241 indicating the name thereof are displayed on the display device 160. The directions in which the user performs the trace operation with a finger are herein defined as follows. On the touch panel 130, the right-to-left direction is denoted as 100A, the left-to-right direction as 100B, the down-to-up direction as 100C, and the up-to-down direction as 100D.

<Example of how Tactile Sensation is Presented in First Trace Operation>

Figure 11:
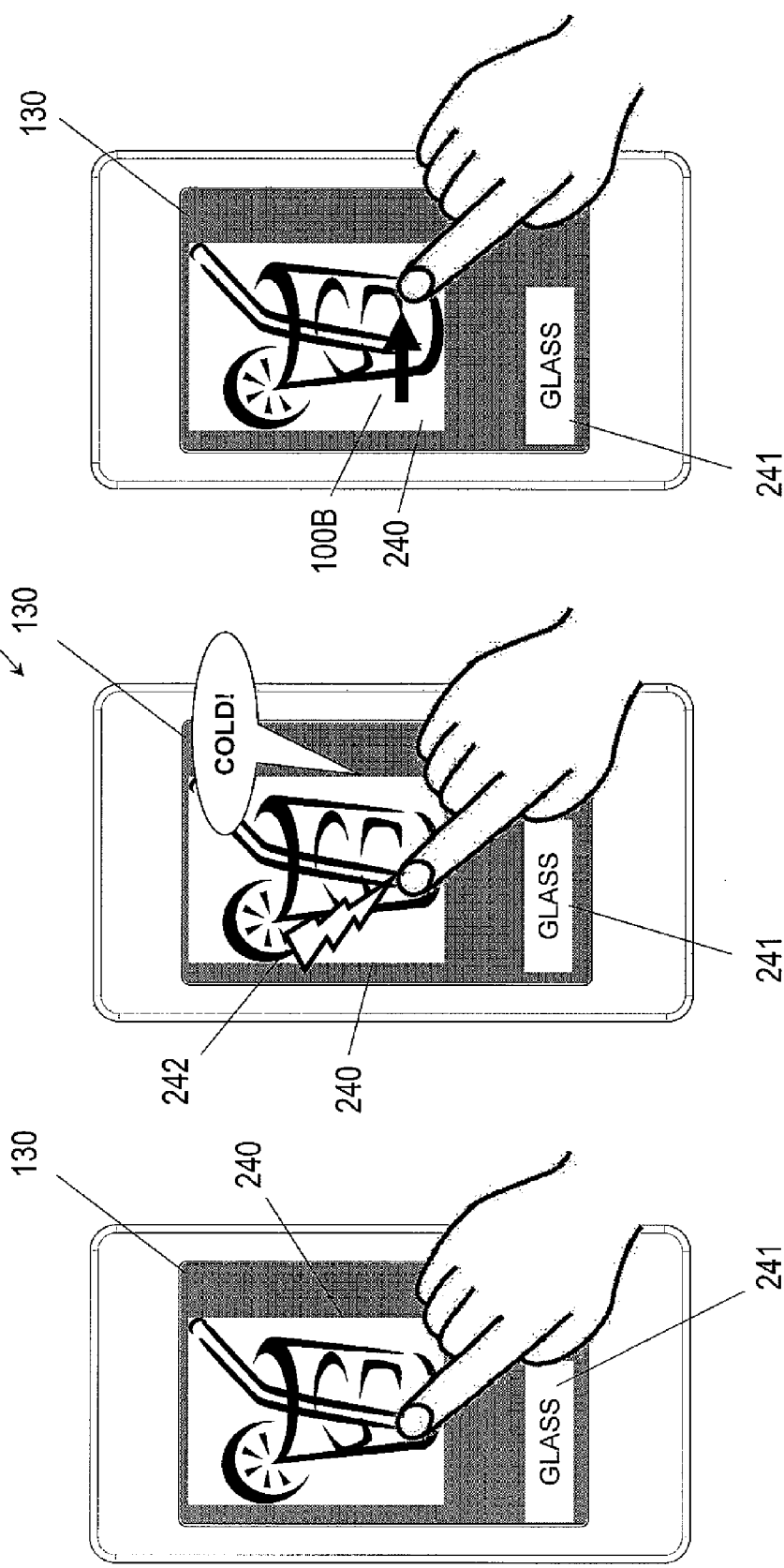
FIGS. 11A to 11C are schematic diagrams showing a first trace operation of an electronic device according to an embodiment.

Next, referring to FIGS. 11 and 12, the operation of presenting a tactile sensation to a user during the first trace operation of the present embodiment will be described.

The temperature control section 195 sets the temperature of the touch panel 130 to a temperature of the object represented by the displayed information that is to be simulatively experienced by the user. For example, the user is allowed to simulatively experience the temperature of a subject in a photographic image or an object represented by computer graphics. In the example shown in FIGS. 11 and 12, a glass with ice cubes therein is displayed on the display device 160, and the user is allowed to simulatively experience the temperature sensation of "it's cold!" which would be felt when touching on a real-world glass with ice cubes in it.

FIGS. 11A to 11C are schematic diagrams showing the trace operation on the touch panel 130. FIG. 12 is a timing diagram during the trace operation, showing the image display, the touch input, the trace operation distance, the cooling temperature control, and the second vibrating section control, from top to bottom.

FIG. 11A shows a state where the glass image 240 is displayed in an upper portion of the display screen. FIG. 11B shows the user having placed a finger on the glass image 240. FIG. 11C shows a state where the user performs the trace operation in the direction of the arrow 100B on the glass image 240, thereby feeling the tactile sensation of the displayed glass.

Figure 12:
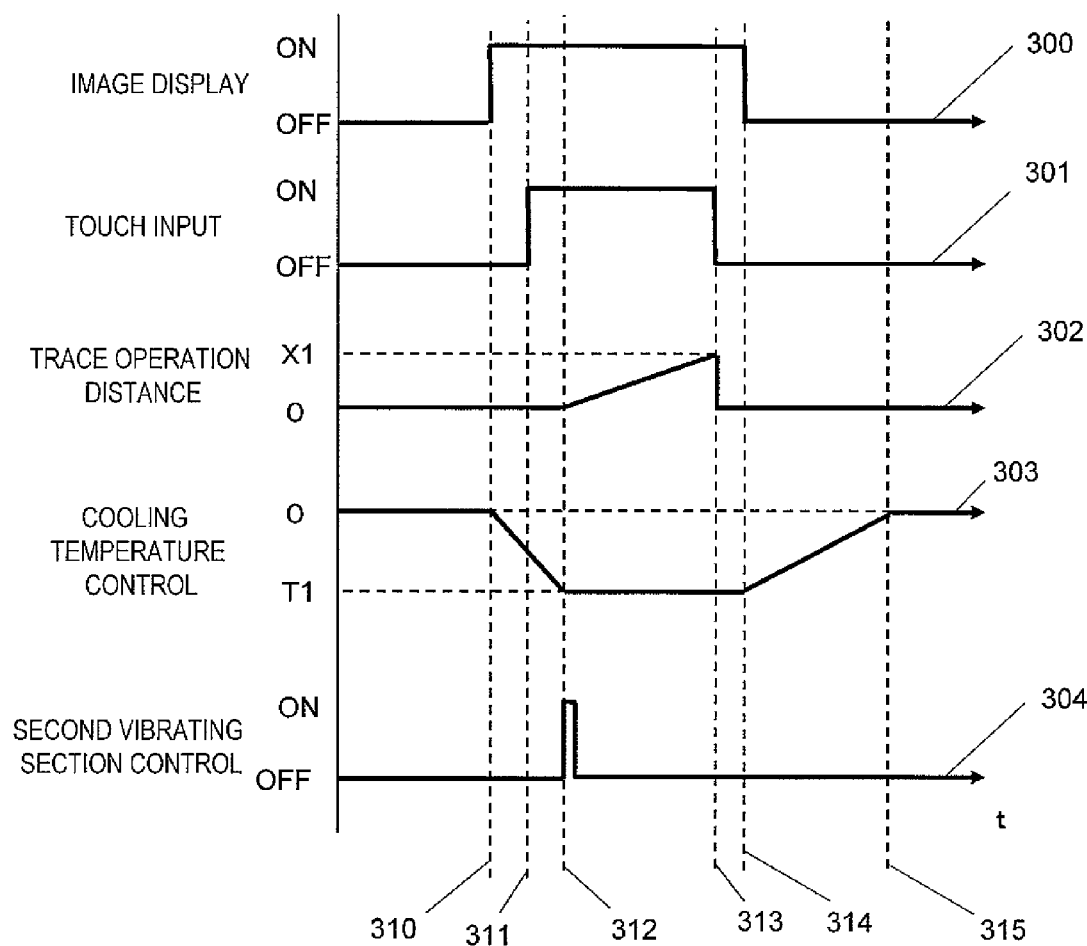
FIG. 12 is a timing diagram during a first trace operation performed on an electronic device according to an embodiment.

Referring to FIG. 12, in a timing diagram 300 for the image display, ON indicates that the glass image 240 is displayed and OFF indicates that it is not displayed. In an operation timing diagram 301 for the touch input, ON indicates that the user is touching on the touch panel 130 and OFF indicates that the user is not touching on the touch panel 130. In an operation timing diagram 302 for the touch position traveling distance, the position at which the user first touches on the touch panel 130 as shown in FIG. 11B is denoted as the origin (0), the distance over which the touch position has moved in the direction of the arrow 100B is denoted as X, and the position at which the user lifts the finger off the touch panel 130 is denoted as X1. An operation timing diagram 303 for the cooling temperature control shows that the initial temperature state is 0, and that T1 denotes the state where it has been cooled by the thermoelectric element sections 190 to a predetermined temperature. An operation timing diagram 304 for the second vibrating section control shows whether the second vibrating section 150 is vibrating, thereby vibrating the electronic device 100.

In the operation of presenting a tactile sensation during a trace operation shown in FIG. 12, an operation as follows is performed when the user touches on the touch panel 130 with a finger.

At time 310, the glass image 240 is displayed, and the cooling temperature control is initiated. At time 311, the user touches on the touch panel 130. The user keeps the finger at a position on the glass image 240 on the touch panel 130 until time 312. In this state, the temperature of the touch panel 130 is cooled, and at time 312 at which the temperature reaches a predetermined temperature (target temperature) T1 that is associated with the glass image 240, the second vibrating section 150 vibrates to generate a vibration 242 to the electronic device 100, thereby notifying the user of the reaching of temperature T1. Thus, it is possible to allow the user to simulatively experience the temperature sensation of "it's cold!" which would be felt when touching on a real-world glass with ice cubes in it. Note that the predetermined temperature T1 associated with the glass image 240 can be set to about 5° C., for example. The temperature T1 may or may not coincide with the temperature of the real version of an object displayed. Even if it does not coincide with the real temperature, it is possible to allow the user to simulatively experience the temperature sensation. After notifying the user of the reaching of the temperature T1, the vibration of the second vibrating section 150 stops, and the temperature is kept at a constant temperature T1 by the cooling temperature control.

Now, vibrating the second vibrating section 150 when the temperature on the touch panel 130 reaches T1 serves the following purposes. Typically, the thermoelectric element sections 190 have poor temperature change response, and it takes time before reaching the temperature T1 associated with the glass image 240 displayed on the touch panel 130. Since the user cannot tell if it has reached the temperature T1 with which the user is to be allowed to simulatively experience the temperature sensation of a real glass based on which the glass image 240 is formed, the second vibrating section 150 is vibrated when the temperature T1 is reached, whereby it is possible to easily notify the user of the reaching of the temperature T1 without displaying anything new. Thus, by notifying of the delay in response of the cooling temperature control by means of the vibrating section, it is possible to improve the usability for the user.

Next, after the user performs a trace operation with a finger in the direction of the arrow 100B until time 313, the user lifts the finger off the touch panel 130. When the display of the glass image 240 ends at time 314, the cooling temperature control ends and it returns to the initial temperature at time 315.

Note that while the second vibrating section 150 is vibrated in the present embodiment when the temperature of the touch panel 130 reaches T1, the first vibrating section 140 may be vibrated instead.

By varying the vibration of the touch panel 130 before and after reaching the target temperature, it is possible to easily notify the user of the reaching of the target temperature. The vibration of the touch panel 130 may be varied by transitioning back and forth between a state where there is no vibration and another state where there is a vibration, or by transitioning from a vibration to another vibration. For example, one may change the frequency and the amplitude from a certain vibration, or may change the cycle on which vibrations are generated.

<Description of Flow of Process During First Trace Operation>

Figure 13:
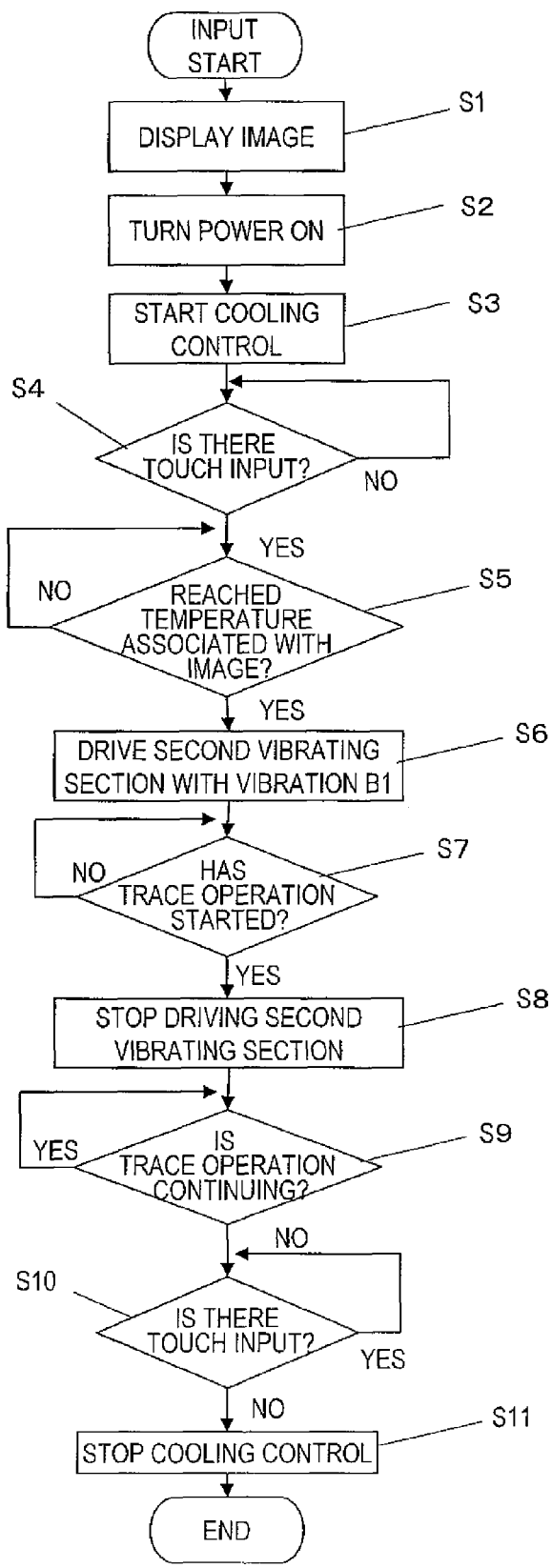
FIG. 13 is a flow chart showing an operation during a first trace operation performed on an electronic device according to an embodiment.

FIG. 13 is a flow chart showing the process during the first trace operation according to the present embodiment. Note that steps are herein abbreviated as "S".

After the input operation starts, in S1, the glass image 240 is displayed as shown in FIG. 11A. In S2, the power of the thermoelectric element sections 190 is turned ON. In S3, the temperature is cooled by the temperature control section 195 to the predetermined temperature T1 based on temperature information that is associated with the glass image 240. Note that when the glass is displayed in an upper portion of the screen, 190a, 190b and 190c of the thermoelectric element sections 190 shown in FIGS. 4, and 191a of the temperature detecting sections 191 are used. This is because since the glass image 240 is displayed in an upper portion of the touch panel 130, those of the thermoelectric element sections 190 and the temperature detecting sections 191 that are arranged in the vicinity thereof are used, thereby increasing the cooling control efficiency and reducing the power consumption. Note that when the glass display position is moved to a lower portion of the screen by a user operation, etc., the temperature control section 195 controls the temperature of the touch panel 130 by using thermoelectric element sections 190d, 190e and 190f and the temperature detecting section 191b. By changing the location where the temperature of the touch panel 130 is controlled in accordance with the movement of the glass display position, it is possible to present to a user a realistic tactile sensation that is linked with the display state.

In S4, the microcomputer 20 determines the presence or absence of a user touch input on the touch panel 130 based on information from the touch panel control section 31. When there is no touch, the process waits until there is a touch again. In S5, it is determined whether the temperature has been cooled by the temperature control section 195 to the predetermined temperature T1 based on temperature information that is associated with the glass image 240. If the temperature has not reached the predetermined temperature T1, the temperature is cooled until it reaches the predetermined temperature T1. If it is determined in S5 that the temperature has reached the predetermined temperature T1, the process proceeds to the next step, S6. In S6, the vibration control section 33 controls the second vibrating section 150, thereby giving vibration B1 to the user. By feeling vibration B1, the user can recognize that the temperature of the touch panel 130 has been cooled to the temperature with which the user is allowed to simulatively experience the temperature sensation of a real glass based on which the glass image 240 is formed. In S7, the microcomputer 20 determines whether there is a finger movement on the touch panel 130 based on information from the touch panel control section 31. If the microcomputer 20 determines that there is no finger movement on the touch panel 130, the process waits until there is a finger movement. Next, in S8, as shown in FIG. 11C, when the user performs a trace operation on the glass image 240 in the direction of the arrow 100B, the vibration control section 33 stops the vibration of the second vibrating section 150. In S9, if the trace operation is continuing, the temperature control section 195 maintains the cooling control. In contrast, if the trace operation ends, and it is determined in S10 that there is no touch input and the glass image 240 is no longer displayed, the temperature control section 195 stops the cooling control in S11.

Thus, in the present embodiment, when the trace operation is performed on a displayed image, the temperature of the touch panel is controlled based on temperature information that is associated with the displayed image, whereby the user can obtain a tactile sensation as if the user were actually touching on a real object of the displayed image. Thus, it is possible to provide an electronic device with excellent controllability. Moreover, when the temperature reaches a predetermined temperature associated with the displayed image, it is notified to the user by means of a vibration, the user can determine whether the predetermined temperature has been reached. That is, there is little awkwardness because there is no significant difference between the temperature sensation which would be felt by the user when touching on a real object, based on which the displayed image is formed, in everyday life and the temperature sensation felt by the user when actually touching on the touch panel.

Note that the displayed image during the first trace operation is an image of a glass in the above description, the present invention is not limited thereto, but the real object represented by the displayed image may be a hot object, for example, and a heating control may be performed instead of a cooling control.

<Example of how Tactile Sensation is Presented in Second Trace Operation>

Next, referring to FIGS. 14 and 15, the operation of presenting a tactile sensation to a user during the second trace operation of the present embodiment will be described.

Figure 14A:
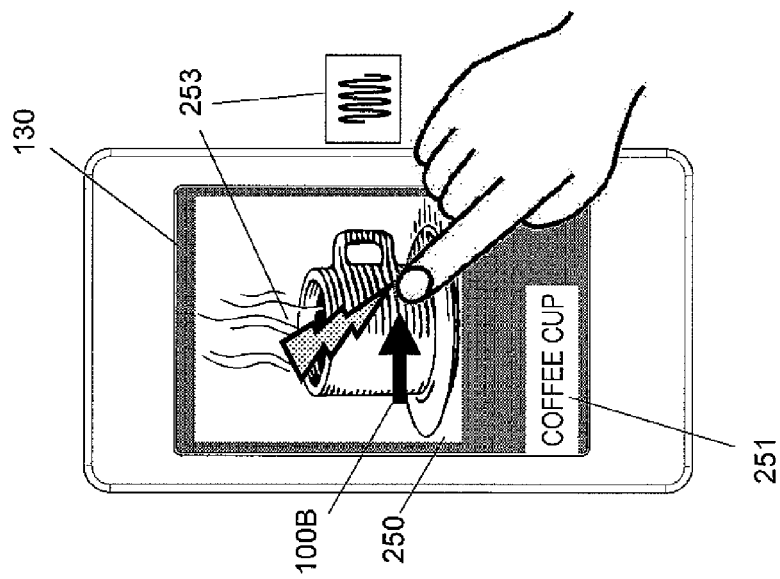
FIGS. 14A to 14C are schematic diagrams showing a second trace operation of an electronic device according to an embodiment.
Figure 14B:
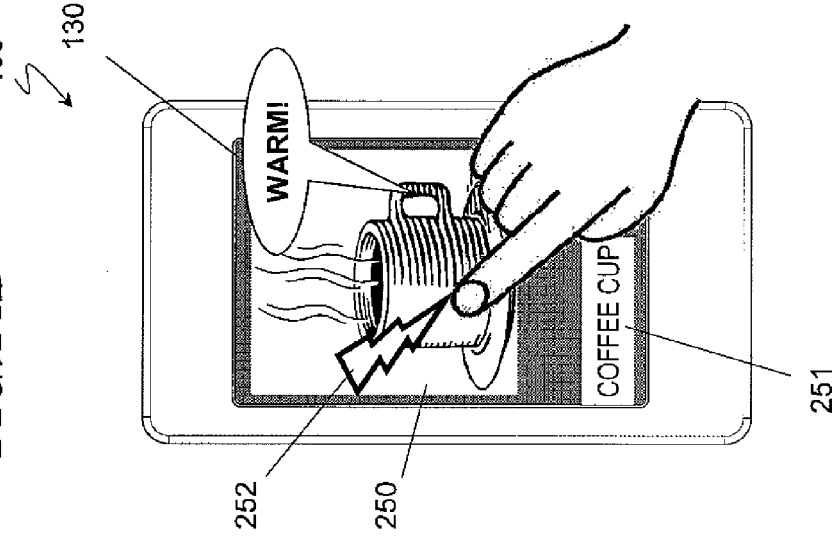
Figure 14C:
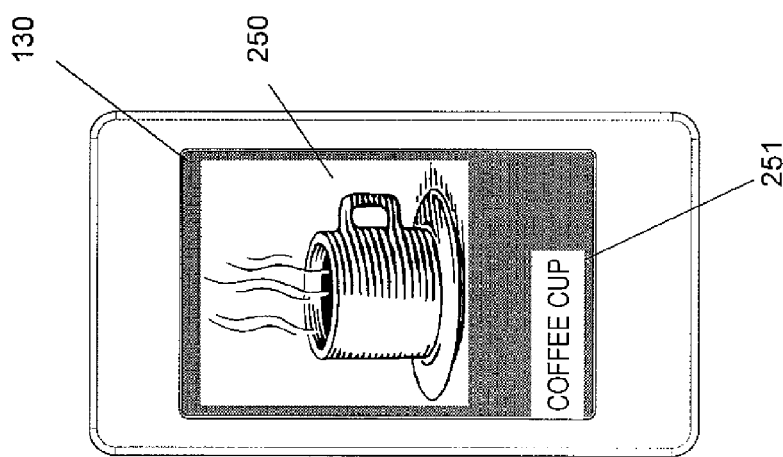

FIGS. 14A to 14C are schematic diagrams showing the trace operation on the touch panel 130. FIG. 15 is a timing diagram during the trace operation, showing the image display, the touch input, the trace operation distance, the heating temperature control, and the second vibrating section control, and the first vibrating section, from top to bottom.

FIG. 14A shows a state where a coffee cup image 250 is displayed in an upper portion of the display screen. FIG. 14B shows the user having placed a finger on the coffee cup image 250. FIG. 14C shows a state where the user performs the trace operation in the direction of the arrow 100B on the coffee cup image 250, thereby feeling the tactile sensation of the displayed coffee cup.

Referring to FIG. 15, in a timing diagram 400 for the image display, ON indicates that the coffee cup image 250 is displayed and OFF indicates that it is not displayed. In an operation timing diagram 401 for the touch input, ON indicates that the user is touching on the touch panel 130 and OFF indicates that the user is not touching on the touch panel 130. In an operation timing diagram 402 for the touch position traveling distance, the position at which the user first touches on the touch panel 130 as shown in FIG. 14B is denoted as the origin (0), the distance over which the touch position has moved in the direction of the arrow 100B is denoted as X, and the position at which the user lifts the finger off the touch panel 130 is denoted as X2. An operation timing diagram 403 for the heating temperature control shows that the initial temperature state is 0 and that T2 denotes the state where it has been heated by the thermoelectric element sections 190 to a predetermined temperature. An operation timing diagram 404 for the second vibrating section control shows whether the second vibrating section 150 is vibrating, thereby vibrating the electronic device 100. An operation timing diagram 405 for the first vibrating section control shows whether the first vibrating section 140 is vibrating, thereby vibrating the touch panel 130.

In the operation of presenting a tactile sensation during a trace operation shown in FIG. 15, an operation as follows is performed when the user touches on the touch panel 130 with a finger.

At time 410, the coffee cup image 250 is displayed, and the heating temperature control is initiated. At time 411, the user touches on the touch panel 130. The user keeps the finger at a position on the coffee cup image 250 on the touch panel 130 until time 412. In this state, the temperature of the touch panel 130 is heated, and at time 412 at which the temperature reaches a predetermined temperature T2 that is associated with the coffee cup image 250, the second vibrating section 150 vibrates to generate a vibration 252 to the electronic device 100, thereby notifying the user's finger of the reaching of temperature T2. Thus, it is possible to allow the user to simulatively experience the temperature sensation of "it's hot!" which would be felt when touching on a real-world coffee cup. Note that the predetermined temperature T2 associated with the coffee cup image 250 can be set to about 35° C., for example. Thereafter, at time 413, the vibration of the second vibrating section 150 stops, and the temperature is kept at a constant temperature T2 by the heating temperature control.

Now, vibrating the second vibrating section 150 when the temperature on the touch panel 130 reaches T2 serves the following purposes. Typically, the thermoelectric element sections 190 have poor temperature change response, and it takes time before reaching the temperature T2 associated with the coffee cup image 250 displayed on the touch panel 130. Since the user cannot tell if it has reached the temperature T2 with which the user is to be allowed to simulatively experience the temperature sensation of a real coffee cup based on which the coffee cup image 250 is formed, the second vibrating section 150 is vibrated when the temperature T2 is reached, whereby it is possible to easily notify the user of the reaching of the temperature T2 without displaying anything new. Thus, by notifying of the delay in response of the heating temperature control by means of the vibrating section, it is possible to improve the usability for the user.

Next, when the user performs a trace operation with a finger in the direction of the arrow 100B from time 413 to time 414, the first vibrating section 140 is vibrated, thereby vibrating the touch panel 130, to transfer the vibration to the user's finger. As the vibration control section 33 controls the first vibrating section 140, the user is given vibration A1 of a vibration pattern 253 that is associated with the feel of the real object of the coffee cup image 250. The vibration pattern 253 is, for example, a sinusoidal wave whose frequency is about 300 Hz, and the amplitude thereof is determined in accordance with the texture (unevenness) of the surface configuration of a real coffee cup. The frequency may be set higher when the speed of the trace operation by the finger of the user is fast, whereas the frequency may be set lower when the speed of the trace operation is slow.

When the user lifts the finger off the touch panel 130 after performing the trace operation until time 414, the vibration also stops. When the display of the coffee cup image 250 ends at time 415, the heating temperature control ends and it returns to the initial temperature at time 416.

Note that while the second vibrating section 150 is vibrated in the present embodiment when the temperature of the touch panel 130 reaches T2, the first vibrating section 140 may be vibrated instead.

<Description of Flow of Process During Second Trace Operation>

Figure 16:
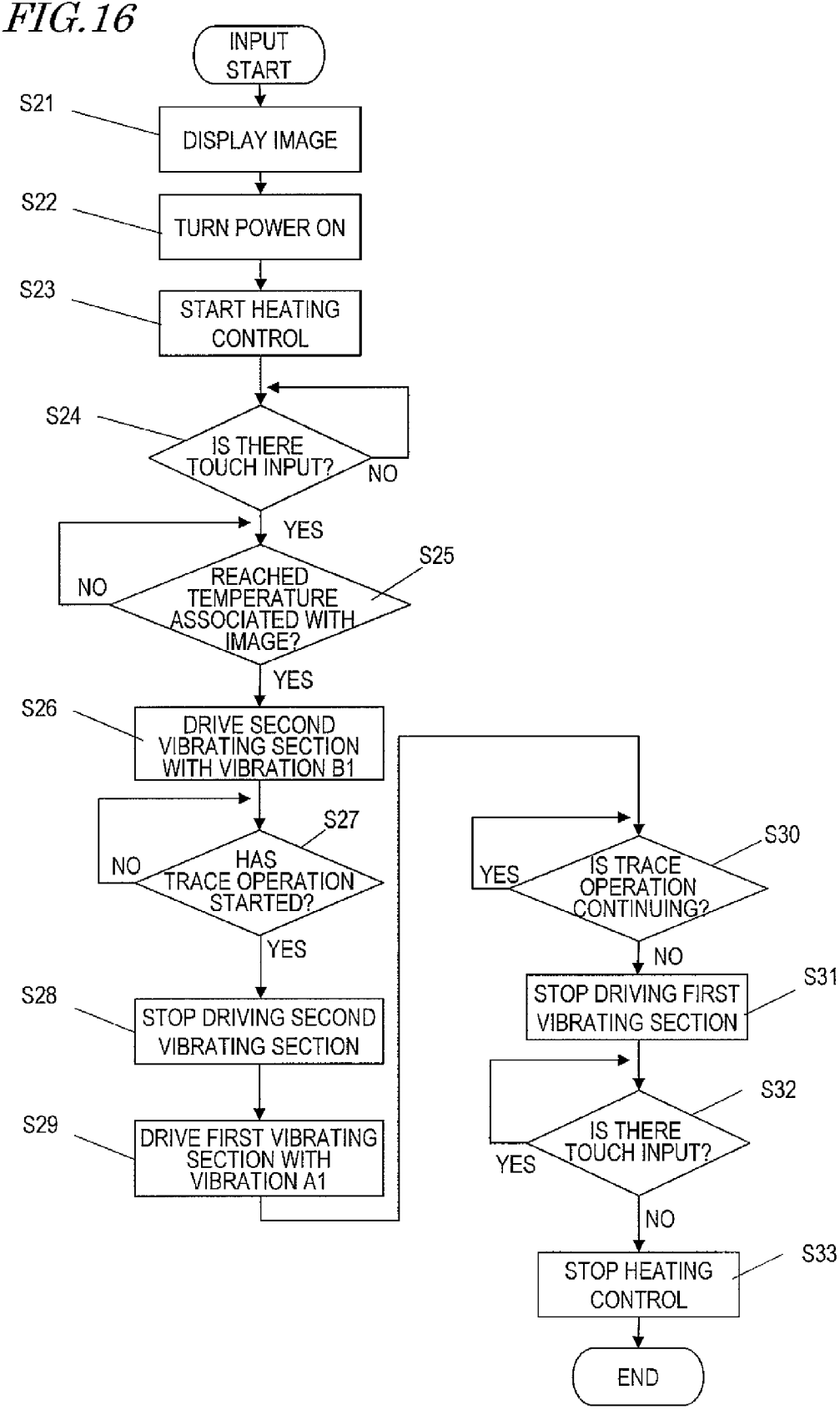
FIG. 16 is a flow chart showing an operation during a second trace operation performed on an electronic device according to an embodiment.

FIG. 16 is a flow chart showing the process during the second trace operation according to the present embodiment. Note that steps are herein abbreviated as "S".

After the input operation starts, in S21, the coffee cup image 250 is displayed as shown in FIG. 14A. In S22, the power of the thermoelectric element sections 190 is turned ON. In S23, the temperature is heated by the temperature control section 195 to the predetermined temperature T2 based on temperature information that is associated with the coffee cup image 250. Note that when the coffee cup is displayed in an upper portion of the screen, 190a, 190b and 190c of the thermoelectric element sections 190 shown in FIGS. 4, and 191a of the temperature detecting sections 191 are used. This is because since the coffee cup image 250 is displayed in an upper portion of the touch panel 130, those of the thermoelectric element sections 190 and the temperature detecting sections 191 that are arranged in the vicinity thereof are used, thereby increasing the heating control efficiency and reducing the power consumption. Note that when the coffee cup display position is moved to a lower portion of the screen by a user operation, etc., the temperature control section 195 controls the temperature of the touch panel 130 by using thermoelectric element sections 190d, 190e and 190f and the temperature detecting section 191b.

In S24, the microcomputer 20 determines the presence or absence of a user touch input on the touch panel 130 based on information from the touch panel control section 31. When there is no touch, the process waits until there is a touch again. In S25, it is determined whether the temperature has been heated by the temperature control section 195 to the predetermined temperature T2 based on temperature information that is associated with the coffee cup image 250. If the temperature has not reached the predetermined temperature T2, the temperature is heated until it reaches the predetermined temperature T2. If it is determined in S25 that the temperature has reached the predetermined temperature T2, the process proceeds to the next step, S26. In S26, the vibration control section 33 controls the second vibrating section 150, thereby giving vibration B1 to the user. By feeling vibration B1, the user can recognize that the temperature of the touch panel 130 has been heated to the temperature with which the user is allowed to simulatively experience the temperature sensation of a real coffee cup based on which the coffee cup image 250 is formed. In S27, the microcomputer 20 determines whether there is a finger movement on the touch panel 130 based on information from the touch panel control section 31. If the microcomputer 20 determines that there is no finger movement on the touch panel 130, the process waits until there is a finger movement. Next, in S28, as shown in FIG. 14C, when the user performs a trace operation on the coffee cup image 250 in the direction of the arrow 100B, the vibration control section 33 stops the vibration of the second vibrating section 150. Then, in S29, the first vibrating section 140 is vibrated, thereby vibrating the touch panel 130, to transfer the vibration the user's finger. As the vibration control section 33 controls the first vibrating section 140, the user is given vibration A1 of the vibration pattern 253 that is associated with the feel of the coffee cup image 250. Then, in S30, if the trace operation is continuing, the temperature control section 195 maintains the heating control, and the vibration control section 33 keeps controlling the first vibrating section 140. In contrast, if the trace operation ends, the control of the first vibrating section 140 is stopped in S31. Then, in S32, if it is determined that there is no touch input and the coffee cup image 250 is no longer displayed, the temperature control section 195 stops the heating control in S33.

Thus, in the present embodiment, when the trace operation is performed on a displayed image, the temperature the touch panel is controlled based on temperature information that is associated with the displayed image, whereby the user can obtain a tactile sensation as if the user were actually touching on a real object of the displayed image. Moreover, the touch panel is vibrated in accordance with the feel of a real object represented by the displayed image during the trace operation, the user can perform the operation while more realistically feeling a tactile sensation as if the user were actually touching on the real object. Thus, it is possible to provide an electronic device with excellent controllability.

Note that while an image of a coffee cup is displayed during the second trace operation in the above description, the present invention is not limited thereto, but the real object represented by the displayed image may be a cold object, for example, and a cooling control may be performed instead of a heating control.

Where different temperatures are prescribed for a plurality of positions of a displayed object, the temperature control section 195 may control the temperature so that a plurality of positions of the touch panel 130 corresponding to the plurality of positions of the object are at different temperatures. For example, where an upper portion of a coffee cup is hot while a lower portion is cold, an upper portion of the touch panel 130 may be heated while a lower portion of the touch panel 130 is cooled.

Where a plurality of objects of different prescribed temperatures are displayed at the same time on the display device 160, the temperature control section 195 may control the temperature so that a plurality of positions of the touch panel 130 corresponding to the plurality of objects are at different temperatures. For example, where a glass with ice cubes in it is displayed in an upper portion of the screen while a coffee cup is displayed in a lower portion of the screen, an upper portion of the touch panel 130 may be cooled while a lower portion of the touch panel 130 is heated.

As described above, the electronic device 100 of the present embodiment includes the display device 160 for displaying the displayed information, the touch panel 130 to be touched by the user, the displayed information control section 32 for controlling the display of the displayed information, the thermoelectric element sections 190 for cooling or heating the touch panel 130, and the temperature control section 195 for controlling the temperature of the touch panel in accordance with the displayed information displayed on the display device 160. Thus, it is possible to represent, and present to a user, a tactile sensation associated with the displayed information.

Moreover, when the displayed information is traced, it is possible to transfer a temperature sensation and/or a feel to a finger of the user based on the temperature information and/or the vibration pattern information associated with the displayed image.

An embodiment has been described above as an example of the technique disclosed in the present application. However, the technique of the present disclosure is not limited thereto, and changes, replacements, additions, omissions, etc., may be added thereto as necessary.

Other embodiments will be shown below.

While image information of a glass and image information of a coffee cup have been shown above as examples of displayed information in the embodiment above, the displayed information is not limited thereto. For example, the displayed information may be image information of a webpage, an email or an SNS (Social Networking Service) page obtained via the external communication section 36 and displayed using an Internet browser. Alternatively, the displayed information may be an image captured by using the camera 15.

The displayed information may be image information of an on-line shopping webpage or a webpage of a manufacturing company, in which case the user is allowed to simulatively experience a tactile sensation of a product.

The electronic device may be a smart phone, a tablet-type information terminal device, a mobile telephone, a PDA, a game device, a car navigation, a personal computer, a television, etc. The electronic device may also be an electronic blackboard or a table-type touch panel device.

While the touch panel 130 has been discussed above as the operated device, the operated device is not limited thereto. For example, it may be a pointing device such as a mouse. In this case, the temperature and the vibration of the pointing device may be controlled.

The thermoelectric elements may be provided on the screen. For example, a thermoelectric element may be provided for each pixel, or a thermoelectric element may be provided for each group of pixels.

Other than temperature and vibration, tactile sensations may be presented in other forms, e.g., as a variation of friction using static electricity, a skin stimulation using electric current, and a variation of screen shape using liquid. In addition to presenting a tactile sensation, screen display, sound, light, etc., may be used in combination as necessary.

Note that the operation of the electronic device described above may be implemented by means of hardware or software. A computer program implementing such an operation is stored, for example, in an internal memory of the microcomputer 20 or in the ROM 38. Such a computer program may be installed onto the electronic device from a storage medium (an optical disc, a semiconductor memory, etc.) storing the computer program, or may be downloaded via a telecommunications network such as the Internet.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is applicable to an electronic device that can be operated by a user, for example.

This application is based on Japanese Patent Applications No. 2011-247184 filed on Nov. 11, 2011 and No. 2012-214767 filed on Sep. 27, 2012, the entire contents of which are hereby incorporated by reference.

What is claimed is:

1. An electronic device comprising:
   a display displays a displayed object on a portion of the display;
   a panel to be touched by a user;
   a display controller controls the display of the displayed object on the portion of the display;
   a thermoelectric element cools or heats the panel; and
   a temperature controller controls a temperature of the panel in a region corresponding to the portion of the display in which the displayed object is displayed, wherein
   the temperature controller controls the temperature in accordance with a temperature information associated with the displayed object displayed on the portion of the display; and
   when the displayed object is initially displayed on the display, the temperature controller automatically starts to control the temperature of the panel so that the temperature is cooled or heated according to the temperature information associated with the displayed object displayed, and the temperature controller continues to automatically control the temperature of the panel according to the temperature information associated with the displayed object for so long as the displayed object is displayed.

2. The electronic device according to claim 1, further comprising:
   a determination section determines presence or absence of temperature information associated with the displayed object,
   wherein if the temperature information is present, the temperature controller controls the temperature of the panel in accordance with the temperature information.

3. The electronic device according to claim 2, wherein the temperature information indicates a temperature prescribed by a user for the displayed object.

4. The electronic device according to claim 1, wherein the temperature controller sets the temperature of the panel to a temperature with which the user is allowed to simulatively experience a temperature which the displayed object would possess in the real-world.

5. The electronic device according to claim 4, wherein:
   the displayed object represents a captured image of a subject; and
   the temperature controller sets the temperature of the panel to a temperature with which the user is allowed to simulatively experience a temperature of the subject.

6. The electronic device according to claim 1, wherein when a display position of the displayed object is moved, the temperature controller changes a position at which the temperature of the panel is controlled in accordance with the movement of the display position.

7. The electronic device according to claim 1, wherein when different temperatures are prescribed for a plurality of positions of the displayed object, the temperature controller sets temperatures of a plurality of positions of the panel corresponding to the plurality of positions of the displayed object to different temperatures.

8. The electronic device according to claim 1, wherein when a plurality of displayed objects having different prescribed temperatures are displayed at the same time on the display, the temperature controller sets temperatures of a plurality of positions of the panel corresponding to the plurality of displayed objects to different temperatures.

9. The electronic device according to claim 1, further comprising:
   a vibrating section vibrates the panel; and
   a vibration controller controls a vibration pattern of the vibrating section,
   wherein the vibration controller controls the vibration pattern of the vibrating section in accordance with the displayed object displayed on the display.

10. The electronic device according to claim 9, further comprising:
    a determination section determines presence or absence of vibration pattern information associated with the displayed object,
    wherein if the vibration pattern information is present, the vibration controller controls the vibration pattern of the vibrating section in accordance with the vibration pattern information.

11. The electronic device according to claim 9, wherein the vibration controller changes the vibration of the vibrating section when the temperature of the panel reaches a target temperature.

12. The electronic device according to claim 1, further comprising:
    a storage section stores a plurality of different displayable objects, the plurality of different displayable objects having respective different temperature information associated therewith;
    wherein, when any of the plurality of different displayable objects is initially displayed on a respective portion of the display, the temperature controller automatically starts to control the temperature of the panel so that the temperature is cooled or heated according to the temperature information associated with the displayable object displayed on the display.

13. The electronic device according to claim 1, wherein the temperature controller controls the temperature of the panel in a region corresponding with only that portion of the display in which the displayed object is displayed.

14. A non-transitory computer readable medium storing a computer program for causing an electronic device to perform a temperature control in accordance with a displayed object, the program causing the electronic device to perform the steps of:
    controlling display of the displayed object on a portion of a display;
    cooling or heating a panel to be touched by a user;
    controlling a temperature of the panel in a region corresponding to the portion of the display in which the displayed object is displayed,
    after the displayed object is initially displayed on the display, automatically starting to control the temperature of the panel in accordance with a temperature information associated with the displayed object so that the temperature is cooled or heated according to the temperature information associated with the displayed object displayed on the portion of the display; and
    continuing to automatically control the temperature of the panel according to the temperature information associated with the displayed object for so long as the displayed object is displayed on the portion of the display.

* * * * *